United States Patent
Mangalam et al.

(10) Patent No.: US 9,863,974 B2
(45) Date of Patent: Jan. 9, 2018

(54) METHOD AND SYSTEM FOR DETERMINING AERODYNAMIC LOADS FROM DOWNSTREAM FLOW PROPERTIES

(71) Applicant: Tao of Systems Integration, Inc., Hampton, VA (US)

(72) Inventors: Arun S. Mangalam, Williamsburg, VA (US); Siva M. Mangalam, Williamsburg, VA (US)

(73) Assignee: Tao of Systems Integration, Inc., Hampton, VA (US)

( * ) Notice: Subject to any disclaimer, the term of this patent is extended or adjusted under 35 U.S.C. 154(b) by 148 days.

(21) Appl. No.: 14/954,222

(22) Filed: Nov. 30, 2015

(65) Prior Publication Data

US 2016/0153825 A1    Jun. 2, 2016

Related U.S. Application Data (60) Provisional application No. 62/123,914, filed on Dec. 2, 2014.

(51) Int. Cl.
| | | |
|---|---|---|
| *G01P 5/01* | (2006.01) | |
| *G01P 5/24* | (2006.01) | |
| *G01P 5/26* | (2006.01) | |
| *G01P 21/02* | (2006.01) | |

(52) U.S. Cl.
CPC .............. *G01P 5/01* (2013.01); *G01P 5/24* (2013.01); *G01P 5/26* (2013.01); *G01P 21/025* (2013.01)

(58) Field of Classification Search
CPC .. G01P 13/025; G01P 5/01; G01P 5/00; G01P 5/10; G01P 5/14
See application file for complete search history.

(56) References Cited

U.S. PATENT DOCUMENTS

| | | | |
|---|---|---|---|
| 3,863,500 A | * | 2/1975 | Yamasaki ............. G01F 1/3218 |
| | | | 73/861.22 |
| 3,927,566 A | | 12/1975 | Zanker |
| 3,996,796 A | | 12/1976 | Adler et al. |
| 4,350,047 A | | 9/1982 | Dewey et al. |
| 4,485,679 A | | 12/1984 | Pitt et al. |
| 4,782,710 A | | 11/1988 | Nagumo et al. |
| 4,920,808 A | * | 5/1990 | Sommer ................. G01P 5/165 |
| | | | 73/170.14 |
| 5,121,658 A | | 6/1992 | Lew |
| 5,150,619 A | | 9/1992 | Turner et al. |
| 5,218,863 A | | 6/1993 | Mangalam |
| 5,247,838 A | | 9/1993 | Heyden et al. |

(Continued)

OTHER PUBLICATIONS

Notification of Transmittal of the International Search Report and the Written Opinion of the International Searching Authority from Application No. PCT/US2015/63150 dated Feb. 9, 2016.

*Primary Examiner* — David A Rogers
(74) *Attorney, Agent, or Firm* — Hunton & Williams LLP (57) ABSTRACT

A method is provided for determining flow conditions for a body immersed in a fluid. The method comprises obtaining flow sensor data downstream of the leading edge stagnation point (LESP) using one or more minimal calibration flow sensors. The method further comprises obtaining at least one normalizing flow parameter value and normalizing the flow sensor data using the at least one normalizing flow parameter value. The method also comprises determining an overall flow condition for the body using the normalized flow sensor data.

15 Claims, 10 Drawing Sheets

(56) References Cited

U.S. PATENT DOCUMENTS

| | | | |
|---|---|---|---|
| 5,299,455 A | | 4/1994 | Mangalam |
| 5,585,557 A | | 12/1996 | Loschke et al. |
| 5,639,964 A | * | 6/1997 | Djorup .................. G01P 5/00 |
| | | | 73/170.12 |
| 5,908,990 A | | 6/1999 | Cummings |
| 6,053,053 A | | 4/2000 | Huotari |
| 6,085,587 A | | 7/2000 | Konzelmann |
| 6,101,429 A | | 8/2000 | Sarma et al. |
| 6,134,959 A | | 10/2000 | Mangalam et al. |
| 6,568,260 B2 | * | 5/2003 | Hakenesch ............ G01L 5/16 |
| | | | 73/170.02 |
| 6,826,493 B1 | * | 11/2004 | Mangalam ............. G01M 9/06 |
| | | | 702/45 |
| 6,963,810 B2 | | 11/2005 | Mangalam |
| 8,061,194 B2 | * | 11/2011 | Gough .................. G01F 1/696 |
| | | | 73/204.25 |
| 8,155,794 B2 | | 4/2012 | Mangalam et al. |
| 8,306,800 B2 | | 11/2012 | Mangalam et al. |
| 8,925,391 B2 | | 1/2015 | Mangalam et al. |
| 2010/0275684 A1 | * | 11/2010 | Gough .................. G01F 1/696 |
| | | | 73/204.25 |
| 2011/0246097 A1 | | 10/2011 | Mangalam |
| 2013/0094012 A1 | | 4/2013 | Peuser et al. |
| 2015/0377915 A1 | * | 12/2015 | Claudel ................ G01P 13/025 |
| | | | 73/170.02 |
| 2016/0123307 A1 | * | 5/2016 | Drack ..................... G01P 3/80 |
| | | | 73/112.01 |
| 2016/0266164 A1 | * | 9/2016 | Ellison .................. B64D 43/02 |

\* cited by examiner

METHOD AND SYSTEM FOR DETERMINING AERODYNAMIC LOADS FROM DOWNSTREAM FLOW PROPERTIES

CROSS-REFERENCE TO RELATED APPLICATIONS

This application claims priority to U.S. Provisional Application No. 62/123,914, filed Dec. 2, 2014, which is incorporated herein by reference in its entirety.

FIELD OF THE INVENTION

The invention relates generally to the determination of aerodynamic and hydrodynamic loads and, more particularly, to the real time determination of fluid flow parameters and load coefficients for a body immersed in a flow regime using sensor data downstream of the leading edge of the body.

BACKGROUND OF THE INVENTION

Determination of aerodynamic forces and moments on an aircraft is critical to aircraft design and safe operation during weather-based disturbances. Aerodynamic loads and moments predicted by theoretical models, however, generally differ from the loads and moments experienced under actual flight conditions, largely due to the dominating role of viscous effects and their interactions with the structure.

Figure 1:
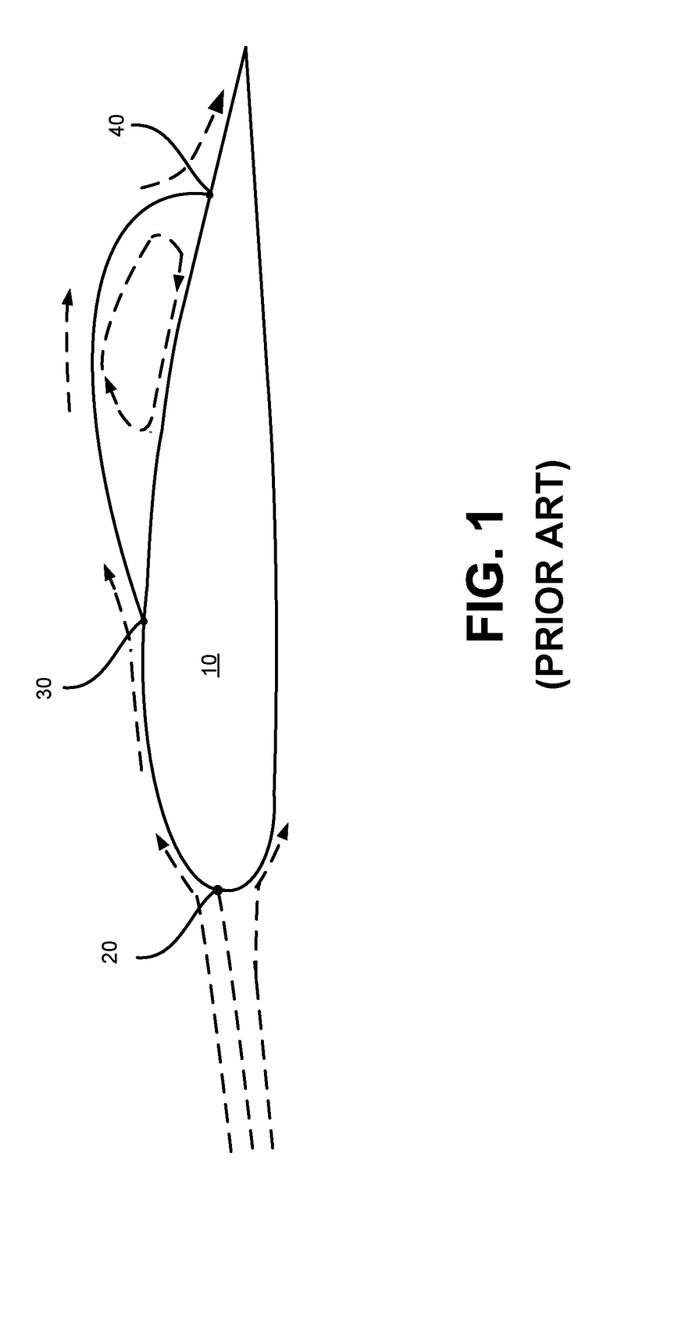
FIG. 1 is a schematic representation of the flow around a wing section.

As described in U.S. Pat. No. 6,826,493 (493 patent) and U.S. Pat. No. 6,963,810 (810 patent), the complete disclosures of which are incorporated herein by reference in their entirety, methods have been developed to relate aerodynamic loads and moments to flow data that can be measured without regard to structural response. These methods involve correlating aerodynamic loads and moments to the spatial locations of critical flow feature indicators (CFFIs), which are associated with certain flow phenomena such as flow bifurcation points, shock waves, and the transition from laminar to turbulent flow. As used herein, the term "flow bifurcation point" (FBP) means a location on a body surface where the flow attaches to or separates from the body. As illustrated in FIG. 1, the FBPs associated with an airfoil 10 may include leading edge stagnation point (LESP) 20, flow separation point (FSP) 30, and flow reattachment point (FRP) 40. The '493 and '810 patents also described how the CFFIs associated with these phenomena can be determined from shear stress and convective heat transfer data obtained from hot film sensors formed on or adhered to the surface of a body immersed in steady or unsteady flow regimes.

In U.S. Pat. No. 8,306,800 (800 patent) the complete disclosure of which is incorporated herein by reference in its entirety, methods are disclosed for modeling aerodynamic forces and moments using FBPs and other CFFIs. In particular, the '800 patent discloses a mathematical model based on potential flow theory combined with conformal transformation. Among other approaches, the model allows the computation of aerodynamic coefficients based on the specification of two FBPs (e.g., LESP and FSP) for a given flow regime.

The above-cited references describe methods for measuring flow parameters and computing aerodynamic coefficients and loads in real time for immersed bodies. The '800 patent, in particular, focused on measurement of flow parameters near the leading edge using hot-film sensors. Embodiments of the present invention extend these methods to provide robust and efficient methods of providing aerodynamic and hydrodynamic load information based on relatively limited sensor data at a distance downstream of the leading-edge.

It will be understood by those of ordinary skill in the art that the methods of the present invention apply to all fluid flow regimes. Thus, although the term "aerodynamic" is used throughout in describing the embodiments of the invention, the invention may also be used in hydrodynamic applications or applications involving any other fluid flow regime.

SUMMARY OF THE INVENTION

An illustrative aspect of the invention provides a method of determining flow conditions for a body immersed in a fluid. The method comprises obtaining flow sensor data downstream of the leading edge stagnation point (LESP) using one or more minimal calibration flow sensors. The method further comprises obtaining at least one normalizing flow parameter value and normalizing the flow sensor data using the at least one normalizing flow parameter value. The method also comprises determining an overall flow condition for the body using the normalized flow sensor data.

Another illustrative aspect of the invention provides a system for determining flow conditions for a body immersed in a fluid. The system comprises at least one minimal calibration flow sensor attached to or incorporated into the body and configured for obtaining fluid flow data downstream of a leading edge stagnation point (LESP) on the body. The system further comprises at least one normalizing flow sensor configured for obtaining normalizing fluid flow data for the body. The system also comprises an automated data processor configured for receiving data from the at least one minimal calibration flow sensor and the at least one normalizing flow sensor. The data processor is further configured for normalizing the minimal calibration sensor flow sensor data using the normalizing flow sensor data and determining an overall flow condition for the body using the normalized flow sensor data.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with the preferred embodiment, it will be understood that it is not intended to limit the invention to those embodiments. On the contrary, it is intended to cover all alternatives, modifications and equivalents that may be included within the spirit and scope of the invention as described.

As discussed above, previous patents and patent applications describe techniques for estimate aerodynamic coefficients (e.g., lift coefficient (CL), moment coefficient (CM) and drag coefficient (CD) as a function of the locations of the multiple FBPs of a body immersed in a fluid under various flow conditions. The present invention provides methods of estimating these coefficients based on sensor information downstream of a single FBP. In particular, the method provides aerodynamic coefficients of a body such as an airfoil based on flow data obtained downstream of the leading edge of the airfoil. These coefficients in combination with measured flow data allows the real-time determination of loads on the body, which can be used in various ways including but not limited to aircraft control, structural configuration control, and warning systems.

Figure 2:
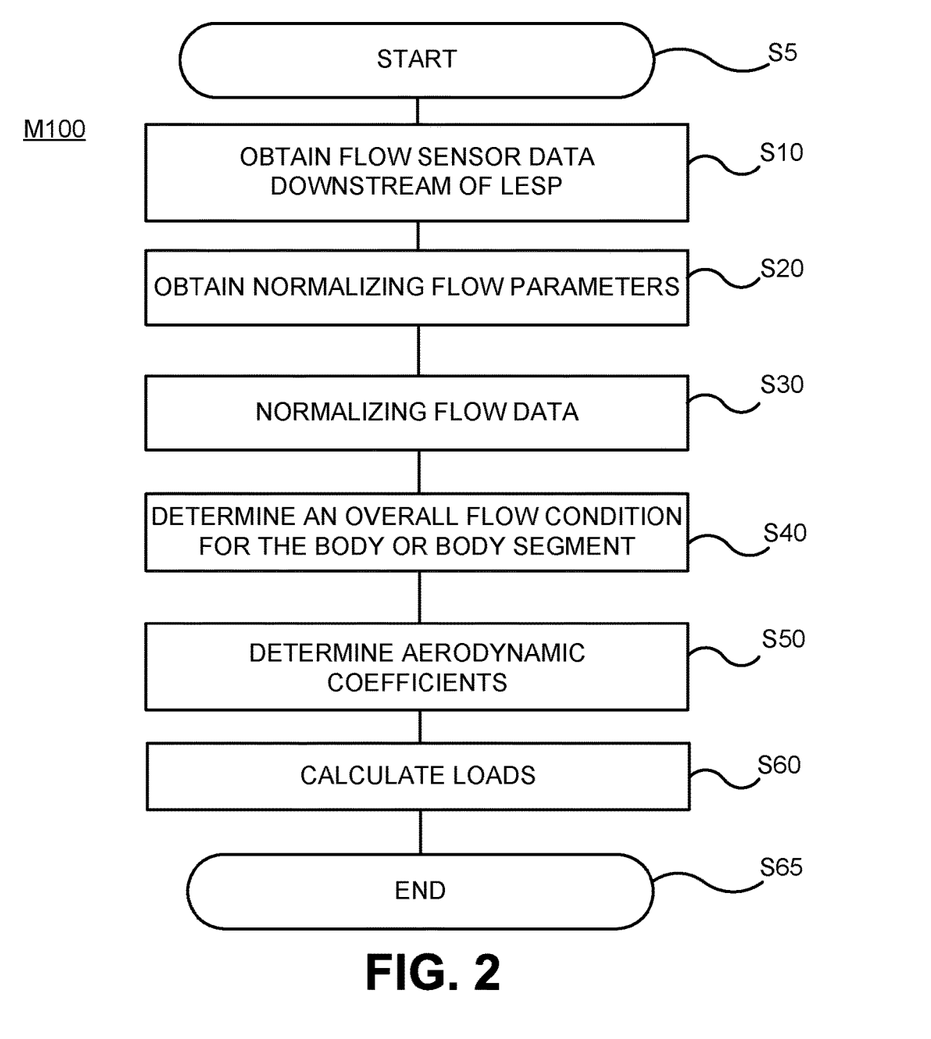
FIG. 2 is a flow diagram of a method for determining overall flow parameters according to an embodiment of the invention.

With reference to FIG. 2 a generalized method M100 may be used to determine one or more overall flow conditions for a body immersed in a fluid. The method M100 begins at S5 and at S10 data regarding the flow downstream of the expected LESP are obtained. These data may be, for example, local momentum, mass flow rate, local flow velocity, static pressure, or shear stress measurements or a combination thereof In some embodiments, the data are mass flow rate measurements obtained using one or more sensors such as those described in U.S. Pat. No. 6,101,429 ("'429 Patent") and U.S. Pat. No. 8,925,391 ("'391 Patent"), the complete disclosures of which are incorporated herein by reference in their entirety.

An advantageous aspect of method M100 and the methods of the invention generally is that the data measurements may be taken from sensors that require minimal calibration and no moving parts. These may include, for example, vortex shedding sensors and time-of-flight sensors. Vortex shedding sensors are sensors that measure the vortex shedding frequency from an obstacle in the flow. See '429 Patent and '391 Patent. Time-of-flight sensors are sensors that measure the time it takes for a particle, thermal, acoustic, and/or electromagnetic wave to travel a distance through a medium. Examples include ultrasonic mass flow sensors, which measure acoustic wave propagation time upstream and/or downstream, and Doppler velocimetry, which measures the time-of-flight for a particle (typically detected optically by lasers or acoustically by ultrasonic sensors). If these sensors are used in combination with a similar reference sensor, then the output becomes invariant with respect to environmental conditions. For example, if the shedding frequency from a probe on the wing is divided by the shedding frequency from a similar probe in the freestream, then the Strouhal number dependency (and consequently Reynolds number dependency) is suppressed, i.e.:

$$f1 = St*U1/L,$$

$$f2 = St*U2/L,$$

$$f1/f2 = U1/U2,$$

where f1 and f2 are Strouhal or vortex shedding frequencies, St is the Strouhal number, U1 and U2 are the local flow speeds and L is the characteristic length of the probe (same for similar probes). It should also be noted that the ratio is also equal to the momentum ratio local to the downstream sensor location.

At S20, normalizing flow parameters are specified or otherwise obtained. The flow parameter input may include information such as freestream velocity, ground speed, Reynolds numbers, kinematic viscosity, and related parameters. A normalizing flow parameter may also be determined from a co-located flow measurement. For example, with a vertical array of ultrasonic flow sensors, the vertical velocity profile may be obtained. The maximum velocity (typically the velocity farthest from the surface) could be used as a normalizing flow parameter. At S30, the sensor data is normalized using the normalizing flow parameters. Normalization may be accomplished by taking the ratio of the sensor data downstream of the LESP with the normalizing flow parameter. By using similar sensors for the downstream sensor data and normalization, variance due to various environmental variations, e.g., temperature, pressure, density, etc. is suppressed, and a non-dimensional flow parameter is obtained that could be compared to non-dimensional parameters for theoretically- or experimentally-derived flow models.

Figure 6:
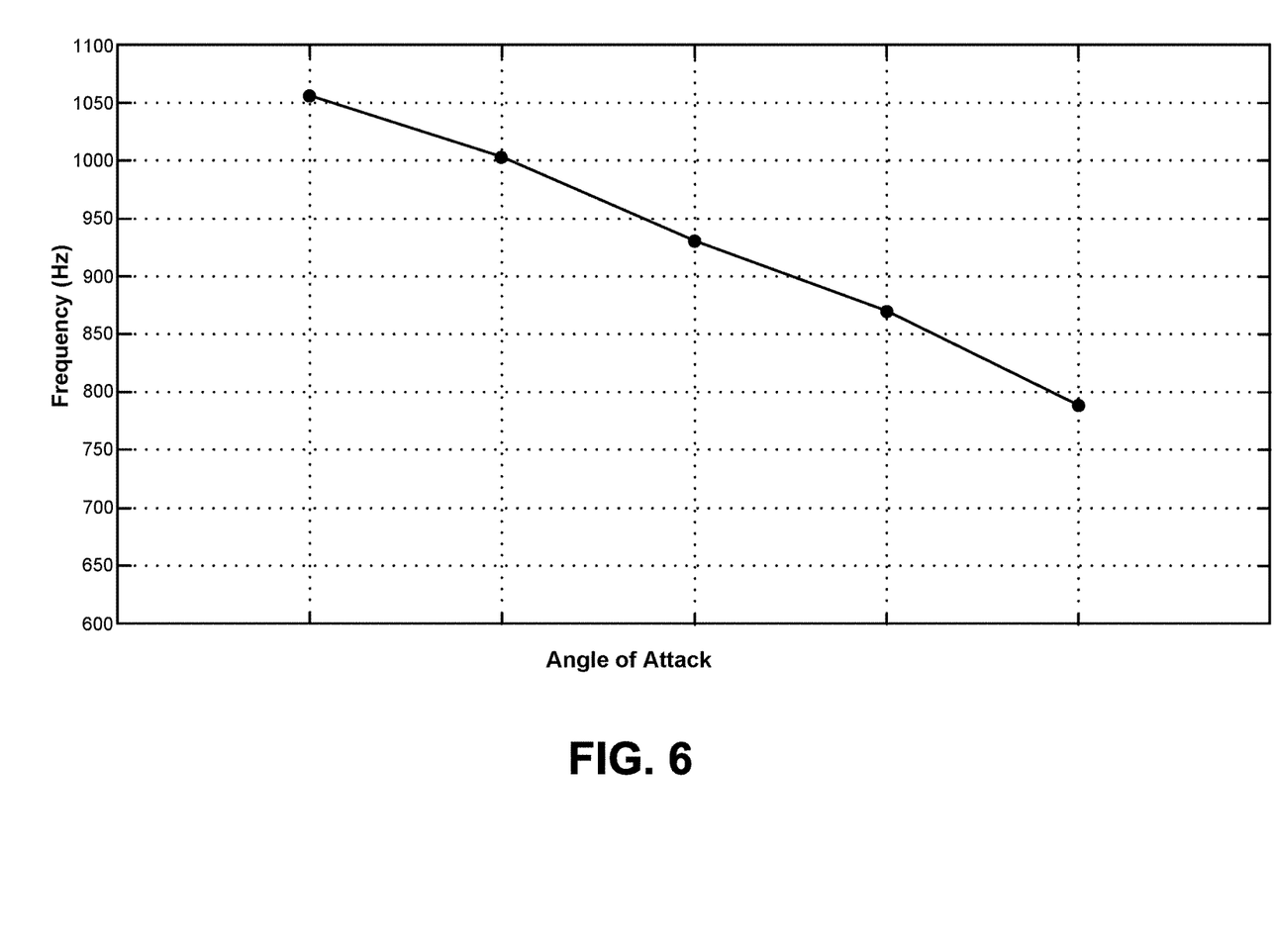
FIG. 6 is a plot showing Strouhal frequency from a vortex flow meter with increasing angle of attack.

At S40, the downstream flow data and flow parameters are used to determine one or more overall flow condition for the body or body segment. Overall flow conditions could include, but are not limited to, change in local momentum, the location of the LESP, stall condition, circulation, extent of icing, impact of rain, etc. LESP location determination may be accomplished by mapping the downstream flow data normalized by flow parameter data (e.g., freestream velocity). For example, FIG. 6 depicts a monotonic relationship between Strouhal frequency measured using a surface vortex shedding meter and increasing angle of attack. The momentum loss, mass flow rate, pressure gradient and shear stress downstream of the leading-edge will change with a change in LESP position and consequent change in viscous effects, e.g., region of transition from laminar to turbulent flow and location of flow separation. Measuring these changes with a downstream sensor (normalized with freestream velocity), the LESP position and local momentum loss can be estimated. For example, by obtaining the frequency ratio of a downstream vortex shedding probe with a freestream vortex shedding probe, we could obtain the local non-dimensional momentum ratio. By comparing this non-dimensional momentum ratio with theoretically calculated (e.g., CFD) and/or experimentally tabulated non-dimensional momentum ratios, we could estimate the expected aerodynamic coefficients and other flow conditions, e.g., LESP location, local momentum loss, etc. The local non-dimensional momentum ratio will be affected by a change in flow conditions including, but not limited to, location of LESP, extent of separated flow, extent of turbulent flow, circulation, extent of icing, and impact of rain. As a specific case, when the wing is exposed to precipitation, the wing performance (lift & drag) degrades due to viscous effects, e.g., earlier transition from laminar to turbulent flow and earlier onset of flow separation. This degradation is observable through a change in the non-dimensional momentum ratio. Other parameters such as Mach number Reynolds numbers may play a role depending on the flight regime and could be incorporated into the method. At S40, the downstream flow data could be used to determine the LESP location on the surface of the body.

Figure 9:
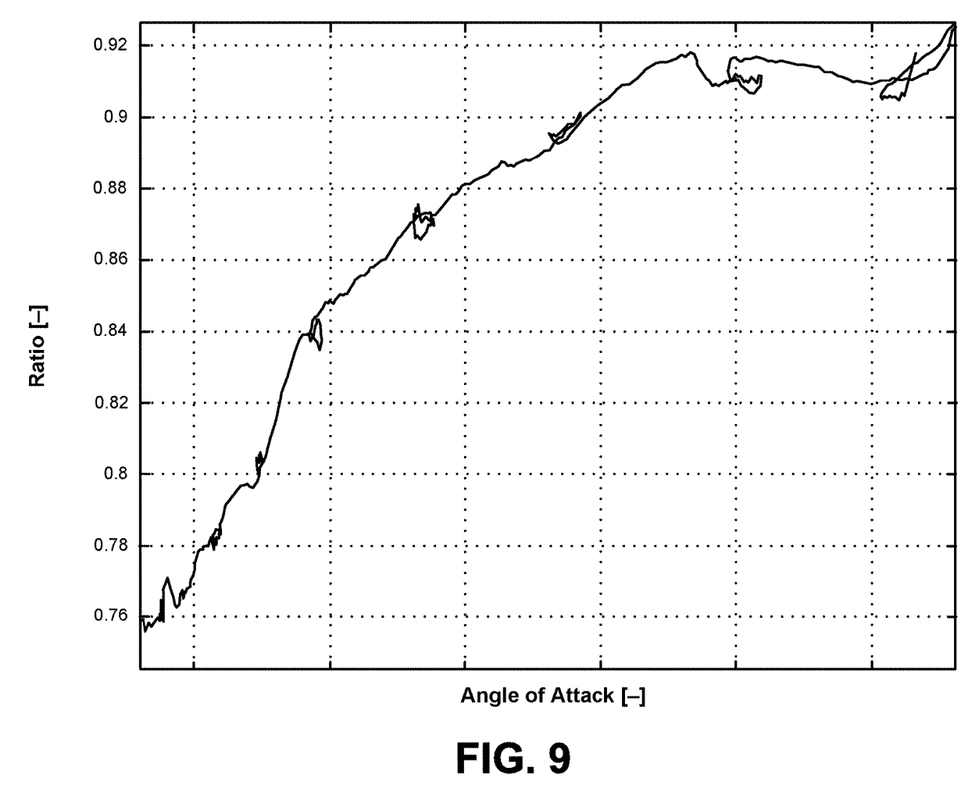
FIG. 9 is a plot showing the measured relationship between a Strouhal frequency ratio and angle of attack.

Similar to determining the LESP position, the stall condition could also be assessed by mapping the downstream flow data normalized by flow parameter data (e.g., freestream velocity). For example, as the ratio of the Strouhal frequency measured by a probe on the pressure side of a wing to the Strouhal frequency measured by a freestream probe approaches unity, the wing is approaching stall. FIG. 9 depicts a plot of this ratio versus angle of attack on an aircraft wing. It can be observed that as the angle of attack increases, the ratio approaches unity, which allows the identification of a stall condition. Circulation can also be assessed by mapping the downstream flow data normalized by flow parameter data. In this case, the use of two downstream probes at two downstream locations allows the mapping of the difference to an increase or loss in circulation. This can then be used to determine circulation in real time or near real time.

In some cases, it may be desirable to determine additional flow parameters. If the LESP location has been determined, an aerodynamic model may be used at S50 to determine one or more aerodynamic coefficients such as CL, CM and CD. The aerodynamic model may be one of an analytical model, an empirical model or a semi-empirical model, each of which is discussed in more detail below.

At S60, standard techniques may be used to calculate aerodynamic loads on the body using flow parameters and the previously determined aerodynamic coefficients. The aerodynamic loads can then be provided to a control system, warning system, or data acquisition system. The method ends at S65.

As discussed above, the method M100 can be used to determine the LESP location from measured surface data. As is discussed in the '493 patent, shear stress or other data may be mapped to the surface of a body for use in identifying FBPs. Similar results may be accomplished using pressure measurements.

The present invention provides a particular approach to the use of the mapped surface data to determine LESP location and/or other flow conditions. In the examples used to describe this approach, surface mass flow rate is used as the measured surface parameter. It will be understood that other measured surface parameters may be used as well. In this embodiment of the invention, the measured surface mass flow rate (or other parameter) at the pressure side of the airfoil can be fitted to a curve representing a theoretical profile that allows the flow bifurcation point to be determined. As the leading edge stagnation point (LESP) moves downstream, the shear stress generally drops. Using the drop in shear stress, normalized for freestream velocity and Reynolds number effects, the LESP position and local momentum ratio can be estimated.

Instead of using shear stress measurements, a vortex shedding flow meter installed on the surface can be used to estimate the local mass flow rate changes associated with LESP movement. The flow meters described in the '391 Patent may be particularly suitable for this purpose. The advantages of using a vortex shedding meter are: (1) one-time, lifetime calibration and (2) all-weather ruggedness using the double wedge configuration. Using the vortex shedding flow meter, as the LESP moves downstream, the mass flow rate changes resulting in a change in measured vortex shedding frequency. To account for density variations, a reference vortex shedding meter could be placed on the fuselage to estimate freestream velocity. The ratio of the wing mass flow rate and the reference provides an output that is invariant of density variations.

As previously described, other types of flow sensors can be used instead of a vortex flow meter. These can include ultrasonic flow sensors to estimate time-of-flight of acoustic waves as a function of surface flow characteristics or surface acoustic wave sensors to estimate frequency/phase shift as a function of surface flow characteristics. In each case, the methods of the invention use a ratiometric measurement to obtain surface flow measurements invariant with freestream velocity.

Figure 3:
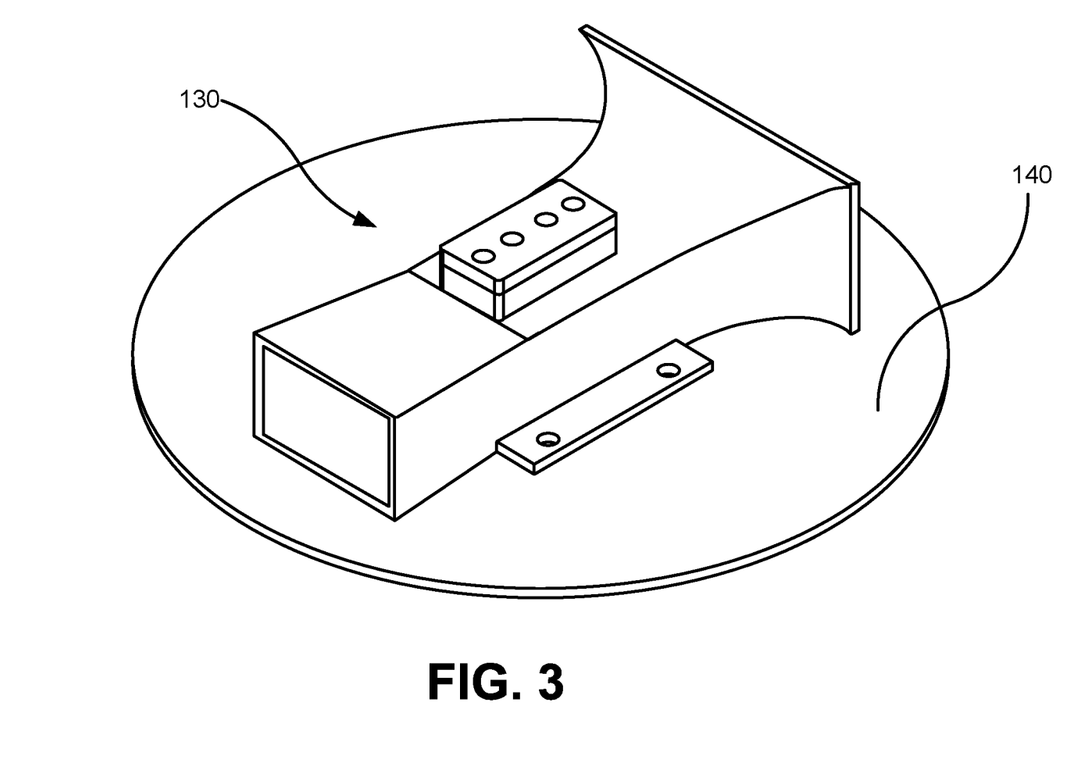
FIG. 3 is an isometric illustration of a vortex flow meter to be placed downstream of the leading edge of an airfoil.
Figure 4:
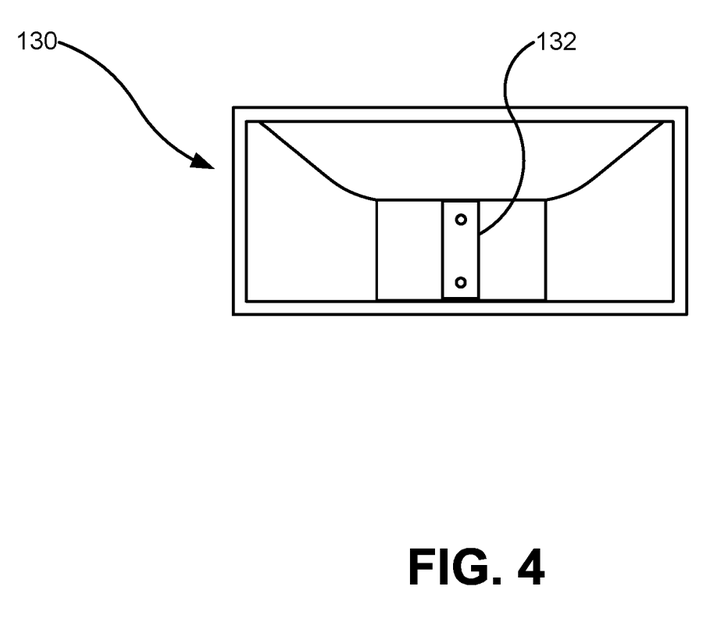
FIG. 4 is a front view of the vortex flow meter with an obstruction in the center.
Figure 5:
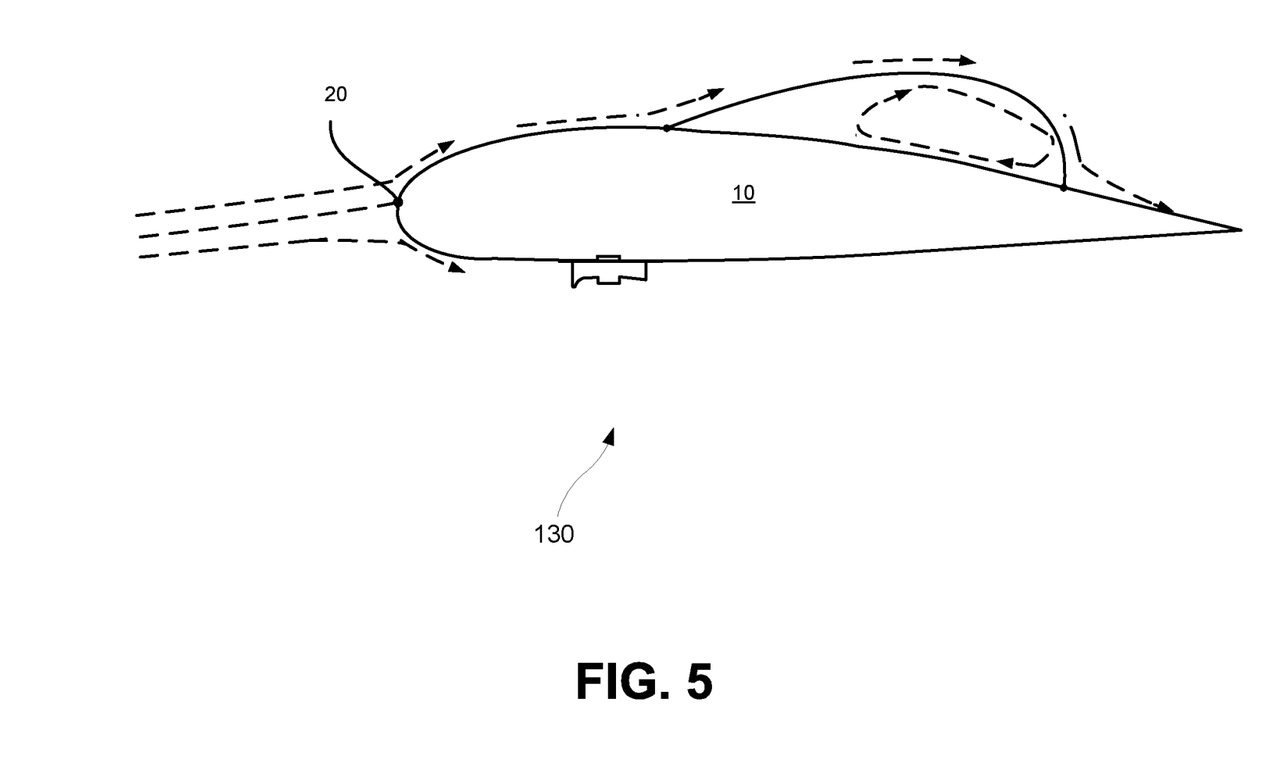
FIG. 5 illustrates an airfoil with a vortex flow meter placed downstream on the pressure side of an airfoil.

FIG. 3 depicts an isometric view of a vortex shedding flow meter 130 placed on a circular plate 140 to be embedded under the wing. FIG. 4 depicts a front view of the same flow meter 130, illustrating the obstruction 132 inside the flow meter that is used by the flow meter as the vortex shedding body. FIG. 5 depicts an airfoil 10 with the vortex shedding flow meter 130 placed approximately a quarter chord from the leading edge. As discussed above, other minimal calibration measurement devices positioned for measurement at similar locations can also be used.

Once the LESP is determined for a particular time, an aerodynamic model may be used to determine the aerodynamic coefficients of the body at that time. As noted above, this model may be generated using one of three approaches. A first approach is to experimentally determine the relationship of each coefficient to LESP under various conditions. This would typically involve instrumenting the wing or other body with sensors to determine the downstream sensor data under various flow and AoA conditions. The data could then be used to determine LESP location. Using standard instrumentation and analysis techniques, the aerodynamic coefficients can also be determined. The LESP and aerodynamic coefficients can be determined for a range of AoAs at a given Reynolds number. Using the acquired data, a function can be determined whose value is an aerodynamic coefficient (CL, CD or CM). This function can then be used in the method of FIG. 2.

A second method of the invention provides a semi-empirical approach to the generation of an aerodynamic model. This method uses a comparison of the experimentally obtained data to a computation fluid dynamics (CFD) solution for the body under the same flow conditions. The first step is to calculate the CFD solution for the given body geometry at various angles of attack. The downstream flow sensor data, LESP location and aerodynamic coefficient for each CFD solution (i.e., at each AoA) can then be calculated. The difference between the LESP location calculated using an inviscid solution and the LESP location determined from experimental data can then be found for each AoA. This difference is referred to herein as "LESP recession." The difference between the aerodynamic coefficient calculated using the inviscid solution and the aerodynamic coefficient determined from experimental data is then calculated for each AoA. This is referred to herein as "change in aerodynamic coefficient." A mathematical fit between the LESP recession and the change in aerodynamic coefficient can then be established. The resulting mathematical fit can be used to generate a function of LESP and AoA whose value is the aerodynamic coefficient. The momentum ratio could also be mapped to the aerodynamic coefficients through a lookup table calculated through experimental data or CFD.

Figure 7:
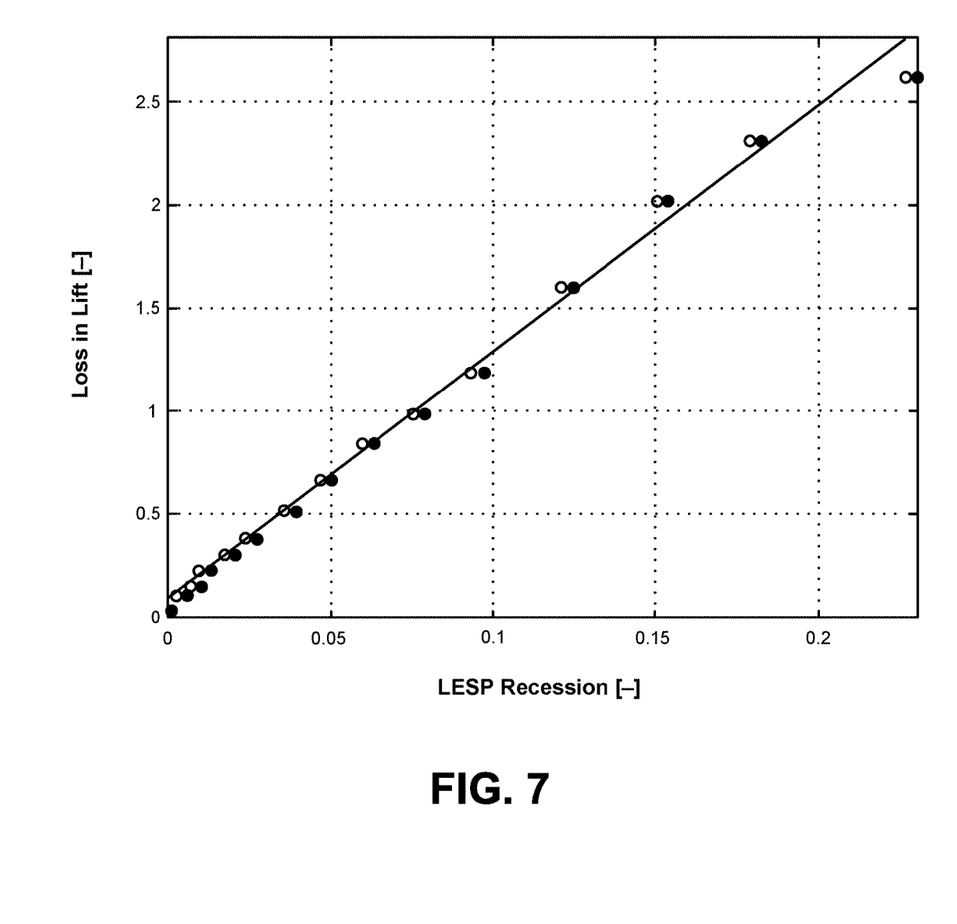
FIG. 7 is a plot of LESP versus the difference in lift coefficient CL for a cambered airfoil.

FIG. 7 is a plot of the LESP recession versus the difference in lift coefficient CL for a cambered airfoil. The measured data were obtained through wind tunnel testing at the Subsonic Aeronautics Research Laboratory at Wright-Patterson Air Force Base. As this plot shows, the relationship is nearly linear, so a first order polynomial with slope K and no offset provides an adequate fit. At a given AoA, LESP_I(AoA) and AC_I(AoA) are the LESP location and aerodynamic coefficient for the inviscid solution, respectively, and LESP_M(AoA) and AC_M(AoA) are the measured LESP location and aerodynamic coefficient, respectively. It can be seen that the relationship between the aerodynamic coefficient and LESP is $$AC\_I(AoA)-AC\_M(AoA)=K^*[LESP\_I(AoA)-LESP\_M(AoA)]$$

Therefore, to estimate the aerodynamic coefficient, AC, at a given AoA and LESP location, $$AC(AoA,LESP\_M(AoA))=AC\_I(AoA)-K^*[LESP\_I(AoA)-LESP\_M(AoA)]$$

Figure 8:
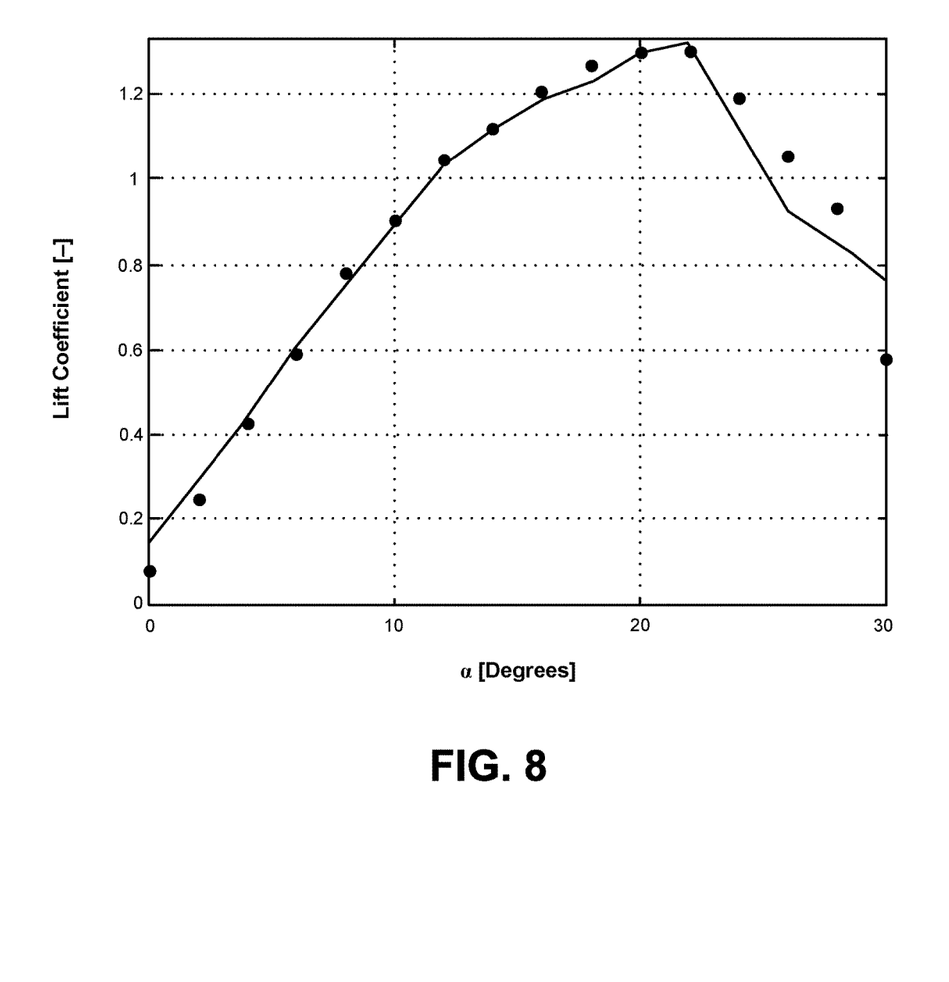
FIG. 8 is a plot showing a comparison of an adjusted inviscid model to measured data for a cambered airfoil.

This function can then be used in conjunction with the inviscid model to obtain the aerodynamic coefficient for any LESP and AoA. FIG. 8 illustrates a comparison of the adjusted inviscid solution resulting from the above-described method (solid line) to measured data (dots) for a cambered airfoil.

It is also possible to obtain an aerodynamic model using analytical techniques alone. For example, a model may be constructed based on running virtual experiments using a Navier-Stokes simulation. Other techniques could include those described in the '800 patent.

Figure 10:
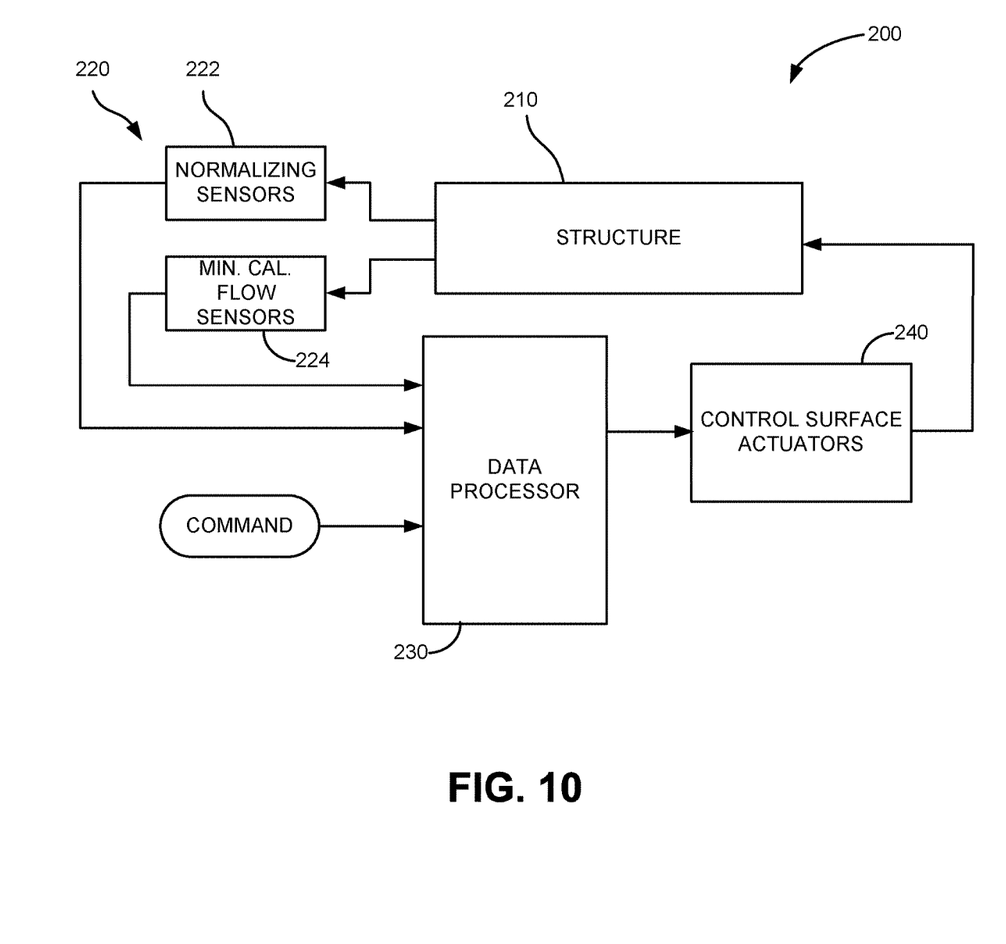
FIG. 10 is a block diagram of a system for determining overall flow parameters according to an embodiment of the invention.

The block diagram in FIG. 10 illustrates an exemplary system 200 that can be used to obtain and use flow conditions for a structure 210 (e.g. an aircraft wing) immersed in a fluid flow regime. The system 200 includes a sensor array 220, which may include one or more normalizing sensors 222 and one or more minimum calibration flow sensors 224 applied to or incorporated into the structure 210 downstream of the LESP. The minimum calibration flow sensors may include one or more of the previously described vortex shedding and time-of-flight sensors.

The system 200 further includes a data processor 230 in communication with the sensor array 220. The data processor 230 is configured for receiving and processing data from the various sensors of the sensor array 220, for normalizing the minimum calibration flow sensor data and determining one or more overall flow conditions for the structure (e.g., LESP location, stall condition, circulation, extent of icing, impact of rain, etc.). The data processor 230 may be further configured to calculate aerodynamic coefficients and determine consequent loads on the structure.

The data processor 230 may also be configured for determining one or more actuator command signals, and for transmitting such actuator command signals to one or more control surface actuators. The data processor 230 may also be configured to receive command inputs from a separate source (e.g., pilot input) for use in determining actuator command signals. Actuation of one or more of these actuators 240 results in a change to either or both of the flow state and the structural state of the structure 210.

In typical embodiments, the structure 210 may be an aircraft. When the pilot desires that the aircraft execute a particular control movement, a command signal is generated (such as by stick movement) and transmitted to the data processor 230. The command may alternatively be provided by an automated flight system such as an autopilot. The data processor 230 may also receive signals from structural sensors and flow sensors positioned in and on the aircraft wing and elsewhere on the aircraft. These sensors provide signals indicative of the aerodynamic flow and resulting motion of aircraft structures, particularly, the aircraft wing. A number of parameters may be sensed in this regard.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its preferred embodiment, it is to be understood that this disclosure is only illustrative and exemplary of the present invention and is made merely for the purposes of providing a full and enabling disclosure of the invention. Many modifications to the embodiments described above can be made without departing from the spirit and scope of the invention. Accordingly, the foregoing disclosure is not intended to be construed or to limit the present invention or otherwise to exclude any other such embodiments, adaptations, variations, modifications and equivalent arrangements.

What is claimed is:

1. A method of determining flow conditions for a body immersed in a fluid, the method comprising:
   obtaining flow sensor data downstream of the leading edge stagnation point (LESP) using a first minimal calibration flow sensor;
   obtaining at least one normalizing flow parameter value using a second minimal calibration flow sensor substantially similar to the first minimal calibration flow sensor;
   normalizing the flow sensor data using the at least one normalizing flow parameter value; and
   determining an overall flow condition for the body using the normalized flow sensor data
   wherein the first and second minimal calibration flow sensors are uncalibrated with respect to environmental conditions.

2. A method according to claim 1, further comprising:
   determining at least one fluid flow coefficient using the overall flow condition for the body; and
   determining at least one fluid flow load on the body using the at least one fluid flow coefficient.

3. A method according to claim 1 wherein the minimal calibration flow sensors include at least one vortex shedding flow sensor.

4. A method according to claim 1 wherein the minimal calibration flow sensors include a time-of-flight sensor configured to measure a travel time through a medium of one of the set consisting of a particle, a thermal wave, an acoustic wave, or an electromagnetic wave.

5. A method according to claim 4 wherein the time-of-flight sensor is or includes one of the set consisting of a laser mass flow sensor, an ultrasonic mass flow sensor, and a Doppler velocimeter.

6. A method according to claim 1 wherein the overall flow condition is an LESP location.

7. A method according to claim 1 wherein the overall flow condition is one of the set consisting of a stall condition, a circulation value, an icing indication, and a precipitation indication.

8. A system for determining flow conditions for a body immersed in a fluid, the system comprising:
   a first minimal calibration flow sensor attached to or incorporated into the body and configured for obtaining fluid flow data downstream of a leading edge stagnation point (LESP) on the body;
   a second minimal calibration flow sensor configured for obtaining normalizing fluid flow data for the body;

an automated data processor configured for
- receiving data from the first minimal calibration flow sensor,
- receiving data from the second minimal calibration flow sensor,
- normalizing the first minimal calibration flow sensor data using the second minimal calibration flow sensor data, and
- determining an overall flow condition for the body using the normalized flow sensor data,
- where the first and second minimal calibration flow sensors are uncalibrated with respect to environmental conditions.

9. A system according to claim 8, wherein the automated data processor is further configured for:
- determining at least one fluid flow coefficient using the overall flow condition for the body; and
- determining at least one fluid flow load on the body using the at least one fluid flow coefficient.

10. A system according to claim 8 wherein the minimal calibration flow sensors include at least one vortex shedding flow sensor.

11. A system according to claim 8 wherein the minimal calibration flow sensors include a time-of-flight sensor configured to measure a travel time through a medium of one of the set consisting of a particle, a thermal wave, an acoustic wave, or an electromagnetic wave.

12. A system according to claim 11 wherein the time-of-flight sensor is or includes one of the set consisting of a laser mass flow sensor, an ultrasonic mass flow sensor, and a Doppler velocimeter.

13. A system according to claim 8 wherein the overall flow condition is an LESP location.

14. A system according to claim 8 wherein the overall flow condition is one of the set consisting of a stall condition, a circulation value, an icing indication, and a precipitation indication.

15. A system according to claim 8, wherein the automated data processor is further configured for:
- determining one or more actuator command signals for transmission to one or more control surface actuators, the one or more command signals being determined at least in part using the overall flow condition.

* * * * *